United States Patent [19]
Potter
[11] 4,275,450
[45] Jun. 23, 1981

[54] MAGNIFICATION/DEMAGNIFICATION APPARATUS AND METHOD

[75] Inventor: Jerry L. Potter, Massillon, Ohio
[73] Assignee: Xerox Corporation, Stamford, Conn.

[21] Appl. No.: 62,607
[22] Filed: Aug. 1, 1979
[51] Int. Cl.[3] .......................... G06F 15/20; H04N 1/04
[52] U.S. Cl. ....................................... 364/515; 358/77; 358/287
[58] Field of Search ........................ 364/515, 701, 703; 358/77, 283, 284, 287; 340/731; 328/38, 39, 41, 48; 307/220 R

[56] References Cited

U.S. PATENT DOCUMENTS

| | | | |
|---|---|---|---|
| 3,541,245 | 11/1970 | Wilby | 358/287 X |
| 3,604,846 | 9/1971 | Behane et al. | 178/6.6 R |
| 3,716,794 | 2/1973 | Teggatz et al. | 328/39 |
| 3,828,169 | 8/1974 | Fluet | 364/703 |
| 3,976,945 | 8/1976 | Cox | 328/48 X |
| 3,976,982 | 8/1976 | Eiselen | 364/515 X |
| 4,075,663 | 2/1978 | Wellendorf | 358/283 |
| 4,163,605 | 8/1979 | Yamada | 358/287 |

*Primary Examiner*—Jerry Smith

[57] ABSTRACT

Apparatus and method to permit selective variation in the size of the output image derived from digital image signals. A Reduction Ratio register is pre-programmed to a count reflecting the image size desired with a Threshold register set to the desired threshold count. The count from the Reduction Ratio register is input to an Accumulator and summed with the count left over from processing the previous image signals. The Accumulator count and the Threshold count are compared. Where the Accumulator count exceeds the Threshold count, the image signal in process is passed on. Where the Accumulator count is less than the Threshold count, the image signal is deleted and the count from an Additive Reset register is added to the Accumulator.

In an alternate embodiment, a Counter is set to the magnification ratio integer number and pulses a control gate astride the stream of image signals according to the Counter setting to generate additional image signals. An Add-one circuit responds to an Accumulator/Threshold register comparison to temporarily increase the setting of the Counter by one.

9 Claims, 5 Drawing Figures

THRESHOLD
ACCUMULATOR
REDUCTION RATIO
ADDITIVE RESET
CLOCK
COMPARATOR

| PIXEL NO. | REDUCTION RATIO | ACCUMULATOR | PIXELS IN | PIXELS OUT |
|---|---|---|---|---|
| 1 | 15 | 15 | 1 | 2 |
| 2 | 15 | 30 | 1 | 2 |
| 3 | 15 | 45 | 1 | 2 |
| 4 | 15 | -40 | 1 | 3 |
| 5 | 15 | -25 | 1 | 2 |
| 6 | 15 | -10 | 1 | 2 |
| 7 | 15 | 5 | 1 | 2 |
| 8 | 15 | 20 | 1 | 2 |
| 9 | 15 | 35 | 1 | 2 |
| 10 | 15 | 50 | 1 | 3 |
| 11 | 15 | -35 | 1 | 2 |

| PIXEL NO. | 0 | 1 | | 2 | | 3 | | 4 | |
|---|---|---|---|---|---|---|---|---|---|
| ADDITIVE RESET 26 | -100 | -100 | -100 | -100 | -100 | -100 | -100 | -100 | -100 |
| REDUCTION RATIO 20 | 64 | 64 | 64 | 64 | 64 | 64 | 64 | 64 | 64 |
| ACCUMULATOR 24 | 0 | 64 | -36 | 28 | 28 | 92 | -8 | 56 | -44 |
| THRESHOLD 32 | 50 | 50 | 50 | 50 | 50 | 50 | 50 | 50 | 50 |
| PIXEL IN | — | X | | X | | X | | X | |
| PIXEL OUT | — | X | | | | X | | X | |

FIG. 3

THRESHOLD
ACCUMULATOR
REDUCTION RATIO
ADDITIVE RESET
CLOCK
COMPARATOR
COUNTER
ADD-ONE
SET CONTROL

MAGNIFICATION/DEMAGNIFICATION APPARATUS AND METHOD

The invention relates to an image magnification/-demagnification apparatus and method, and more particularly to a simplified magnification/demagnification system for changing the size of a digitized image.

It is often desireable to be able to reduce, i.e., demagnify, or enlarge, i.e., magnify digital images. Most prior art arrangements however, are relatively complex, requiring substantial amounts of expensive hardware to accomplish image magnification and demagnification. In many cases, the value of the image signal or pixel being processed must be determined before the requisite processing steps can be carried out, with attendant additional hardware requirements.

This invention relates to an apparatus for selectively controlling the size of the output image formed from a series of image pixels, the combination comprising: a first register programmable with a count representing the image size selected; an accumulator coupled to the first register for receiving the count in the first register; a second register programmable with a count representing image threshold level; comparator means for comparing the counts in the accumulator and the second register; pixel control means for regulating passage of the image pixelss from an input line to an output line in response to the signal output of the comparator means; and timing means for successively introducing the count from the first register into the accumulator and actuating the comparator means to compare the count in the accumulator with the threshold count in the second register for each of the image pixels, the comparator means producing an enabling signal when the count in the accumulator is greater than the count in the second register whereby the pixel control means passes the image pixel being processed from the input line to the output line, the pixel control means preventing passage of the image pixel being processed from the input line to the output line in the absence of the enabling signal.

The invention further relates to a method of controlling the size of the image produced from a stream of discrete image pixels, the steps which comprise: storing a count determinative of the image size selected; summing the stored count with the count leftover from processing the preceeding image pixel; comparing the summed count with a preselected threshold count; and deleting the image pixel being processed from the image pixel stream when the summed count is less than the threshold count.

In the drawings:

FIG. 3 is a table illustrating operation of the apparatus shown in FIG. 1 for an exemplary image demagnification ratio;

Figure 1:
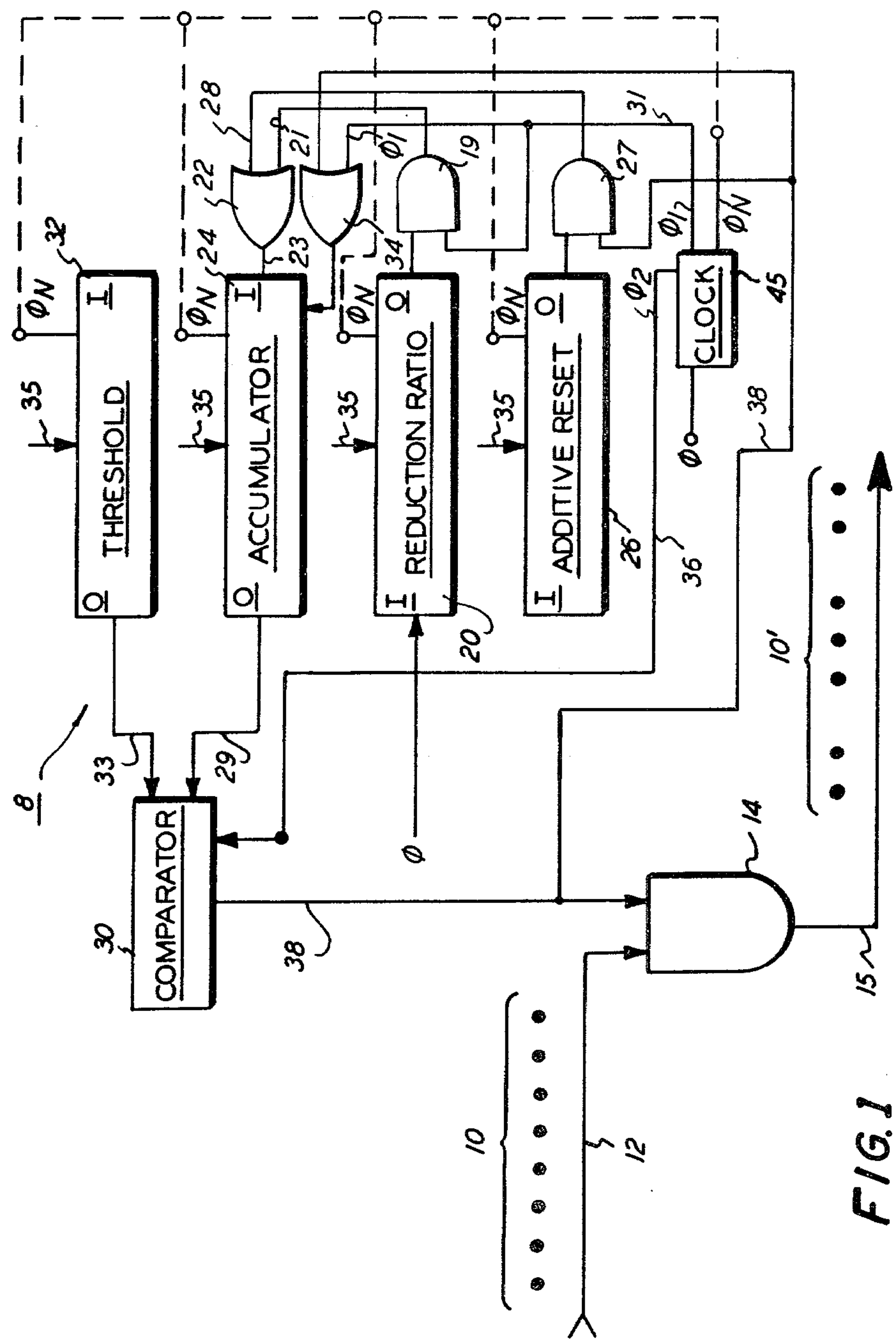
FIG. 1 is a schematic view of the image size varying apparatus of the present invention.
Figures 2, 5:
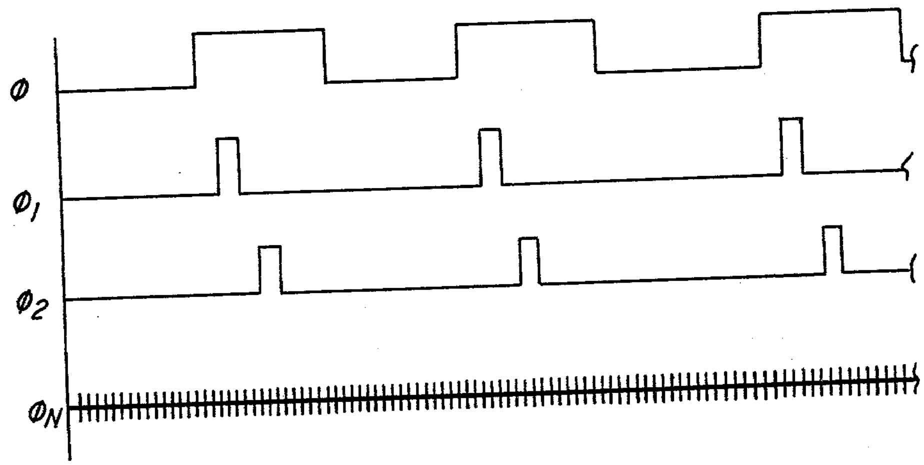
FIG. 2 is a timing chart showing the operational sequence of the apparatus shown in FIG. 1.
FIG. 5 is a table illustrating operation of the apparatus shown in FIG. 4 for an exemplary magnification ratio.

Referring to FIGS. 1 and 2, the image reduction system 8 according to the present invention is thereshown. Referring thereto, a stream 10 of digital image signals or pixels from a suitable source, which may for example, comprise a raster scanner, computer, etc., are input through lead 12 to control gate 14 at a predetermined pixel clock rate $\phi$. The stream 10' of pixels output by gate 14, the pixel content of which may be different than input stream 10, are fed via output line 15 to a suitable output device, for example, a reproduction or copying apparatus (not shown). One suitable output device is the Xerox Model 9700 reproduction machine.

It will be understood that image size along the scan line (i.e., the X direction) may be controlled by inserting additional image pixels in the image data stream 10' where image enlargement or magnification is desired or, where image reduction or demagnification is desired, removing or deleting image pixels from the image stream. Where the clock rate or frequency of the output device is the same as the pixel clock rate $\phi$, the scan line is lengthened by the added image pixels. Where pixels are removed, the scan line is shortened. While not part of this invention, it will be understood by those skilled in the art that changes in image size along the other image dimension (i.e., the Y direction) may be similarly effected by adding image scan lines for an enlarged or magnified image or removing image scan lines for a reduced or demagnified image.

Reduction system 8 includes a Reduction Ratio register 20, the output side (0) of which is coupled through AND gate 19 and lead 21 to one input of OR gate 22. The output of OR gate 22 is coupled by lead 23 to the input side (I) of an Accumulator 24. An additive Reset register 26 has the output side (O) thereof coupled through AND gate 27 and lead 28 to a second input of OR gate 22. The output side (O) of Accumulator 24 is coupled by lead 29 to one input of Comparator 30. A Threshold register 32 is provided, the output side (O) of Threshold register 32 being coupled by lead 33 to a second input of Comparator 30.

Registers 20,26,32 comprise programmable registers which hold in binary arithmetic form the current count setting of registers 20,26,32. The current count setting of registers 20,26,32, which is available at the register output side (O), is accessed by an enabling signal to the input side (I) of the receiving register. For input of the count in Reduction Ratio register 20 to Accumulator 24, an enabling clock signal $\phi_1$ is provided to the input side (I) of Accumulator 24 through clock lead 31 and OR gate 34. At the same time, clock signal $\phi_1$ is input to gate 19 of Reduction Ratio register 20 to enable gate 19 and permit transfer of the count in register 20 to Accumulator 24.

For input of the count in Additive Reset register 26 to Accumulator 24, an enabling signal from Comparator 30 is input to gate 27 of Additive Reset register 26 and to the input side (I) of Accumulator 24 through lead 38 and OR gate 34. For input of the count in Accumulator 24 and the count in Threshold register 32 to Comparator 30, an enabling clock signal $\phi_2$ is provided in clock lead 36 to Comparator 30.

To permit registers 20,26,32 and accumulator 24 to be preset to a desired count, a programming lead 35 is provided for each register. A suitable controller (not shown) may be coupled to programming leads 35 to permit the user or operator to program registers 20,26,32 to preset counts corresponding to the image size desired.

Comparator 30 comprises a digital comparator effective to compare the count signals input by Accumulator 24 and Threshold register 32 thereto and provide an output signal in lead 38. In the example shown, comparator 30 generates a binary "1" (High) when the count of Accumulator 24 equals or exceeds the count of Threshold register 32 and a binary "0" (Low) signal when the count of Threshold register 32 exceeds the count of Accumulator 24.

Lead 38 couples the output of Comparator 30 to a second input of control gate 14. In the exemplary arrangement shown, control gate 14 comprises an AND gate. Where the output signal of Comparator 30 is "1" (High), control gate 14 is enabled and the image pixel passes therethrough to output lead 15. Where the output of Comparator 30 is "0", (Low), control gate 14 remains in a blocking condition and the image pixel is not output to lead 15. In addition, lead 38 couples the output of Comparator 30 to a second input of AND gate 27 and OR gate 34 to enable transfer of the count in Additive Reset register 26 to Accumulator 24 when the output signal of Comparator 30 is high.

A suitable clock 45 is provided for generating pixel clock pulses $\phi$ and clock signals $\phi 1, \phi 2$. Clock 45 may also be used to generate high speed pulses $\phi n$ for driving registers 20,26,32 and Accumulator 24 to output the current count setting thereof to the receiving register when register 20, 26, or 32, or Accumulator 24 is accessed.

Referring particularly to the example shown in FIGS. 2 and 3, where a reduction in image size of 0.64 is desired, Reduction Ratio register 20 is preset to a count of 64 through programming lead 35 thereof. Additive Reset register 26 is preferably preset to a count of −100 while Threshold register 32 is preferably preset to a count of 50.

At startup, the count on Accumulator 24 is 0. On clocking of the first pixel (i.e. pixel #1) to control gate 14, clock pulse $\phi 1$ enables transfer of the preset count (i.e. 64) in Reduction Ratio register 20 to Accumulator 24 where the newly introduced count is added to the existing count (i.e. 0) in Accumulator 24. On clock pulse $\phi 2$, the counts in Accumulator 24 and Threshold register 32 (i.e. 64 and 50) are compared by Comparator 30. Inasmuch as the count in Accumulator 24 is greater than the count in Threshold register 32, the output of Comparator 30 goes high. The signal in output lead 38 of Comparator 30 enables control gate 14 and the image pixel (i.e. pixel #1) passes into output lead 15.

Additionally, the signal in lead 38 enables AND gate 27 to transfer the preset count in Additive Reset Register 26 (−100) to Accumulator 24. The signal in lead 38 to OR gate 34 enables Accumulator 24 for this purpose. There, the existing count (64) and the newly introduced count (−100) are summed. The count in Accumulator 24 is now −36. On the next pixel, (i.e. pixel #2) the count from Reduction Ratio register 20 (i.e. 64) is input to Accumulator 24 where the count is summed with the existing count in Accumulator 24 (i.e. −36). The count in Accumulator 24 becomes 28. On clock pulse $\phi 2$, the counts in Accumulator 24 and Threshold register 32 are compared (28 vs. 50). Since the count in Threshold register 32 is larger, the output of Comparator 30 to output lead 38 is low and control gate 14 is inhibited. Control gate 14 therefore blocks transfer of the image pixel (i.e. pixel #2) to output lead 15.

With the signal in output lead 38 low, gate 27 remains in a blocking condition preventing transfer of the count in Additive Reset register 26 to Accumulator 24. Accordingly, the count (28) in Accumulator 24 remains unchanged.

On the next cycle, the count (64) in Reduction Ratio register 20 is added into Accumulator 24. The count in Accumulator 24 is then 92 (28+64). As described, the counts in Accumulator 24 and Threshold register 32 are compared by Comparator 30 (92 vs. 50). Since the count in Accumulator 24 is larger than the count in Threshold register 32, the output of Comparator 30 goes high enabling control gate 14 to pass the pixel (i.e. pixel #3) to output lead 15.

The enabling signal in lead 38 enables gate 27 and Accumulator 24 to transfer the count (−100) in the Additive Reset register 26 to Accumulator 24. There, the existing count (92) in Accumulator 24 is summed with the count (−100) introduced from register 26 to provide a count of −8 in Accumulator 24.

The aforedescribed process is repeated for each pixel until the entire stream of pixels are processed.

Figure 4:
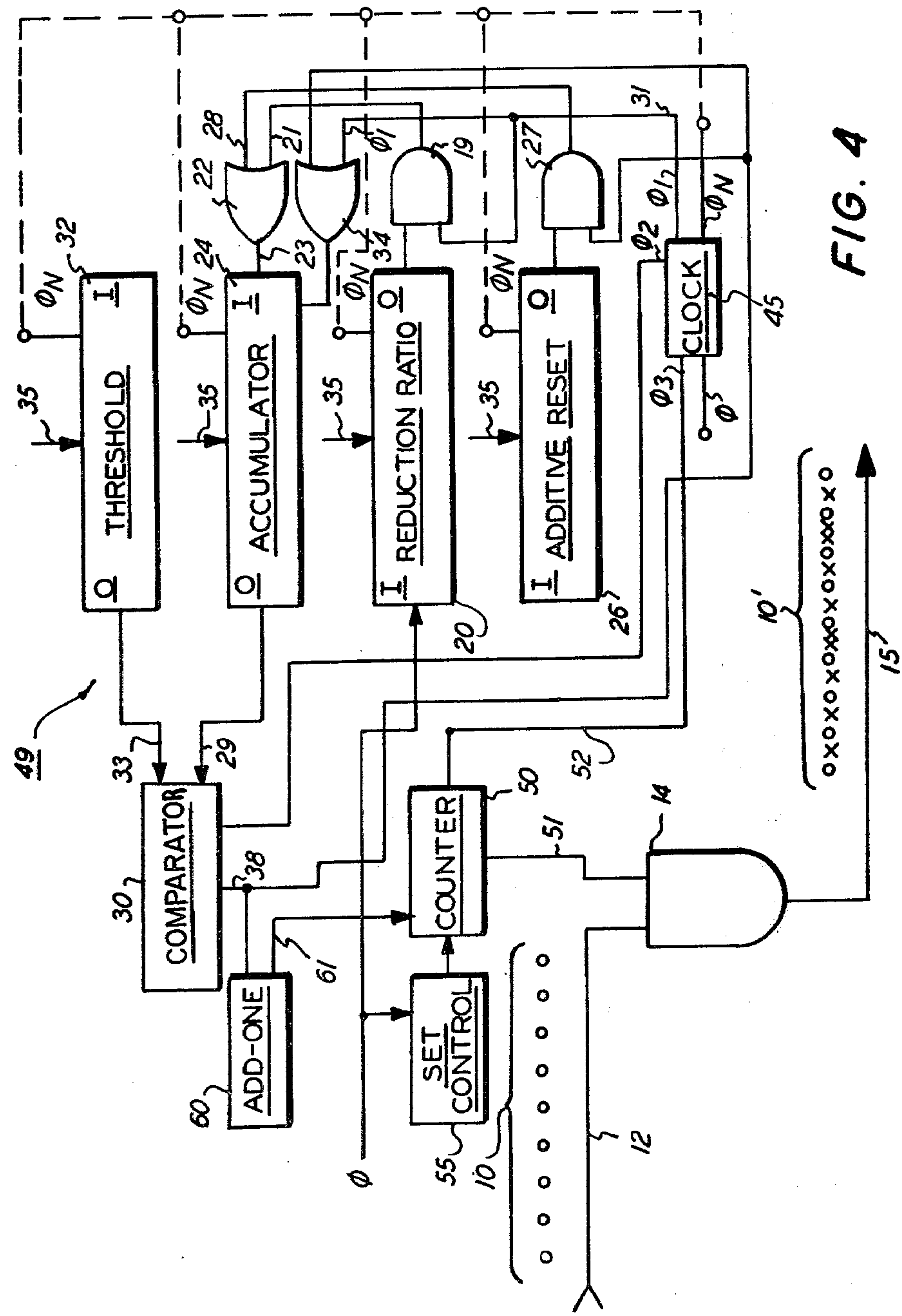
FIG. 4 is a schematic view of an alternate embodiment of the image size apparatus of the present invention.

The embodiment shown in FIGS. 1–3 is limited to demagnification or image reduction. In the embodiment shown in FIGS. 4 and 5, where like numerals refer to like parts, an image magnification/demagnification system 49 is shown effective to permit the image size to be either reduced as in the previous embodiment or enlarged. Referring thereto, a programmable Count 50 is provided, the output of Counter 50 being coupled to control gate 14 through lead 51. A Set Control register 55 is provided for Counter 50 to permit the user or operation to program Counter 50 to the desired magnification ratio. Counter 50, is initialized to the value in set control register 55 on each pixel clock pulse $\phi$.

Counter 50 is driven by pulses $\phi 3$ in clock lead 52 and generates enable pulse in lead 51 equal in number to the integer number to which counter 50 is set. The frequency of clock pulses $\phi 3$ is at some convenient multiple of the pixel clock pulses $\phi$ to assure pulsing of Counter 50 the required number of times between each pixel clock pulse $\phi$. The pulse or signal output of Counter 50 to control gate 14 enables gate 14 to pass image pixels from input lead 12 to output lead 15. Where the output pulses of Counter 50 are greater than one, each pixel input to control gate 14 is multiplied to provide a multiple pixel output to lead 15.

An Add-one circuit 60 is coupled to the output of Comparator 30 through lead 38. The output of circuit 60 is input to Counter 50 through lead 61. Add-one circuit 60 is preset such that on an enabling signal from Comparator 30, circuit 60 generates a control pulse in lead 61 to advance the magnification setting of counter 50 by 1. For example, if Counter 50 is set to a magnification ratio of 2, actuation of Add-one circuit 60 advances the magnification setting of Countor 50 to 3.

Presuming, for example, that it is desired to magnify the image 2.15 times the original image size, Set Control register 55 is set to the integer number of the magnification ratio desired, in this case 2. This value is gated to Counter 50 on each pixel clock pulse $\phi$. Accordingly, on each pixel clock pulse $\phi$, Counter 50 generates at least two enabling pulses to actuate control gate 14 twice for each image pixel input to gate 14. As a result, each image pixel input to control gate 14 is doubled when output to lead 15.

To accommodate the fractional portion of the selected image magnification ratio, if any, Reduction Ratio register 20 is preset thereto. In the example being considered, register 20 is set to a count of 15 representing the 0.15 portion of the exemplary 2.15 magnification ratio. On processing the first pixel (i.e. pixel #1), a count of 15 is added to Accumulator 24 from Reduction Ratio register 20 and the values of Accumulator 24 and Threshold register 32 compared (15 vs. 50). Since the count in Threshold register 32 is larger, no enabling signal appears at the output of Comparator 30. As a result, the program setting of Counter 50 remains at 2. Consequently two enable pulses are generated in lead 51 during $\phi_3$.

The aforedescribed is repeated for pixels #2 and #3 with the count in Accumulator 24 increasing in steps from 15 to 30 to 45. On processing pixel #4, the count from Reduction Ratio register 20 is added to Accumulator 24 raising the count in Accumulator 24 to 60. Comparator 30 compares the count (60) in Accumulator 24 with the count (50) in Threshold register 32 and, since the count in Accumulator 24 is greater, generates an enabling pulse in lead 38. The enabling pulse from Comparator 30 actuates Add-one circuit 60 to advance the control setting of Counter 50 by 1. In this example, the magnification setting of Counter 50 is changed from 2 to 3. Counter 50 accordingly enables control gate 14 three (3) times to generate three output pixels for pixel #4 in output line 15. At the same time, the enabling signal from Comparator 30 actuates Accumulator 24 to add the count from the Additive Reset register 26 (i.e. −100). The count in Accumulator 24 is now −40.

On the next pixel (i.e. pixel #5), since the count in Accumulator 24 (−40+15=−25) is less than the count (50) in Threshold register 32, the signal output of Comparator 30 is low. Counter 50 is reset to the count in set control 55 (i.e. 2) at clock phase $\phi$ and accordingly outputs 2 enabling pulses to control gate 14 to produce 2 output pixels during clock phase $\phi_3$. The above process continues until the image pixel stream is processed.

Where image reduction is desired, Set Control 55 is set to 0 which in turn programs Counter 50 to zero. As a result, each enabling pulse generated by Comparator 30 actuates Add-one circuit 60 to advance the setting of Counter 50 to one (1). Counter 50 accordingly generates a single enabling pulse to control gate 14. Where the output of Comparator 30 is low, Add-one circuit 60 is not activated and no enabling pulse is generated by Counter 60. In that circumstance, the image pixel being processed is blocked by control gate 14 as described heretofore.

As will be understood, reduction or magnification of an image involves a ratio of less than 1 (for reduction) or greater than 1 (for magnification). In the present invention, magnification/reduction ratios are represented as a whole and fractional part. The whole part may be an integer from 0 to 9. If 0, reduction will result. If 1 or greater, magnification will occur. The fractional part is represented as integers between 0 and 99 (i.e., the exemplary 64 count setting of Reduction Ratio register 20 in the FIGS. 1–3 enbodiment) or multiples of 1 (i.e. the integer 2 setting of Set Control register 55 in the FIGS. 4–5 embodiment). The count of −100, to which Additive Reset register 26 is preferably set, is chosen as the integer representation of unity or 1 while the count of 50, to which Threshold register 32 is preferably set, is chosen as the point where fractions are normally rounded off.

In the invention described herein, image reduction/-magnification ratios from 0 to 9.99 may be readily implemented. The invention is particularly useful for image pixels of relatively high resolution, typically 500 pixels per inch and greater. Higher resolution levels of this type permit pixels to be dropped from the pixel stream for demagnification purposes without noticeable loss in image content.

The present invention provides a substantially continuous range of reduction and magnification with good quality from about 0.3 to 5× image size. Further, the present invention, which operates on a pixel-by-pixel basis without requiring knowledge of the image value of any pixel, is easily implemented While the invention has been described with reference to the structure disclosed, it is not confined to the details set forth, but is intended to cover such modifications or changes as may come within the scope of the following claims:

What is claimed is:

1. Apparatus for selectively controlling the size of the output image formed from a series of image pixels, comprising, in combination:

(a) a first register programmable with a count representing the image size selected;

(b) an accumulator coupled to said first register for receiving the count in said first register;

(c) a second register programmable with a count representing image threshold level;

(d) comparator means for comparing the counts in said accumulator and said second register;

(e) pixel control means for regulating passage of said image pixels from an input line to an output line in response to the signal output of said comparators means; and (f) timing means for successively introducing the count from said first register into said accumulator and actuating said comparator means to compare the count in said accumulator with the threshold count in said second register for each of said image pixels, said comparator means producing an enabling signal when the count in said accumulator is greater than the count in said second register, whereby said pixel control means passes the image pixel being processed from said input line to said output line, said pixel control means preventing passage of the image pixel being processed from said input line to said output line in the absence of said enabling signal.

2. The apparatus according to claim 1 including:

a third register programmable with a reset count, said accumulator being coupled to said third register for receiving the count in said third register, said comparator means enabling signal actuating said third register to introduce said reset count into said accumulator when the count in said accumulator is greater than the count in said second register.

3. The apparatus according to claim 1 including counter means programmable with the integer value of the image magnification desired interposed between said comparator means and said pixel control means, said counter means being adapted to multiply said enabling signals a number of times equal to the integer value for which said counter means is programmed to cause said pixel control means to pass additional ones of the image pixel being processed and provide a magnified output image.

4. Apparatus for selectively controlling the size of the output image formed from a series of image pixels, comprising, in combination:

(a) a first register programmable with a count representing the image size selected;

(b) an accumulator coupled to said first register for receiving the count in said first register;

(c) a second register programmable with a count representing image threshold circuit;

(d) comparator means for comparing the counts in said accumulator and said second register;

(e) pixel control means for regulating passage of said image pixels from an input line to an output line in response to the signal output of said comparator means;

(f) timing means for successively introducing the count from said first register into said accumulator and actuating said comparator means to compare the count in said accumulator with the threshold count in said second register for each of said image pixels, said comparator means producing an enabling signal when the count in said accumulator is greater than the count in said second register, whereby said pixel control means passes the image pixel being processed from said input line to said output line, said pixel control means preventing passage of the image pixel being processed from said input line to said output line in the absence of said enabling signal;

(g) counter means programmable with the integer value of the image magnification desired interposed between said comparator means and said pixel control means, said counter means being adapted to multiply said enabling signals a number of times equal to the integer value for which said counter means is programmed to cause said pixel control means to pass additional ones of the image pixel being processed and provide a magnified output image; and (h) means responsive to said comparator means enabling signal to raise said counter means integer value by one to cause said pixel control means to pass an additional image pixel.

5. The method of controlling the size of the image produced from a stream of discrete image pixels, the steps comprising:

(a) storing a count determinative of the image size selected;

(b) summing said count with the count left over from processing the preceding image pixel;

(c) comparing the summed count with a preset threshold count;

(d) deleting the image pixel being processed from the image pixel stream when the summed count is less than the threshold count;

(e) storing an additive reset count; and (f) summing said additive reset count with the count left over from processing the image pixel when the summed count is greater than said threshold count.

6. The method according to claim 5 including the steps of:

(a) storing a count reflecting the integer number of the image magnification selected; and (b) duplicating the image pixel being processed a number of times equal to said stored integer count whereby the number of image pixels is increased and the image magnified.

7. The method of controlling the size of the image produced from a stream of discrete image pixels, the steps comprising:

(a) storing a count determinative of the image size selected;

(b) summing said count with the count left over from processing the preceding image pixel;

(c) comparing the summed count with a preset threshold count;

(d) deleting the image pixel being processed from the image pixel stream when the summed count is less than the threshold count;

(e) storing a count reflecting the integer number of the image magnification selected;

(f) duplicating the image pixel being processed a number of times equal to said stored integer count whereby the number of image pixels is increased and the image magnified;

(g) storing a count representing the fractional portion of the image magnification selected;

(h) summing said stored fractional count with the count left over from processing the preceding image pixel;

(i) comparing the summed count with said preset threshold count; and (j) duplicating the image pixel being processed at least one additional time when the summed count exceeds said threshold count.

8. The method of controlling the size of the image produced from a stream of discrete image pixels, the steps comprising:

(a) storing a count determinative of the image size selected;

(b) summing said count with the count left over from processing the preceding image pixel;

(c) comparing the summed count with a preset threshold count;

(d) deleting the image pixel being processed from the image pixel stream when the summed count is less than the threshold count;

(e) storing an additive reset count;

(f) summing said additive reset count with the count left over from processing the image pixel when the summed count is greater than said threshold count;

(g) storing a count reflecting the integer number of the image magnification selected;

(h) duplicating the image pixel being processed a number of times equal to said stored integer count whereby the number of image pixels is increased and the image magnified;

(i) storing a count representing the fractional portion of the image magnification selected;

(j) summing said stored fractional count with the count left over from processing the preceding image pixel;

(k) comparing the summed count with said preset threshold count; and (l) duplicating the image pixel being processed at least one additional time when the summed count exceeds said threshold count.

9. The method of controlling the size of the image produced from a stream of discrete image pixels, the steps comprising:

(a) storing a count determinative of the image size selected;

(b) summing said count with the count left over from processing the preceding image pixel;

(c) comparing the summed count with a preset threshold count;

(d) deleting the image pixel being processed from the image pixel stream when the summed count is less than the threshold count;

(e) storing a count reflecting the integer number of the image magnification selected; and (f) duplicating the image pixel being processed a number of times equal to said stored integer count whereby the number of image pixels is increased and the image magnified.

* * * * *